3,533,815
STABILIZED ZIRCONIA BODIES
William J. Baldwin, Snyder, N.Y., assignor to National Lead Company, New York, N.Y., a corporation of New Jersey
No Drawing. Filed May 1, 1967, Ser. No. 634,855
Int. Cl. C04b 35/48
U.S. Cl. 106—57                     4 Claims

ABSTRACT OF THE DISCLOSURE

Refractory stabilized zirconia bodies with good heat-shock resistance, good hot load bearing characteristics, and relatively low reactivity with dielectric titanate compositions are produced by the addition to a mix consisting essentially of granular zirconia, about 75% to about 95% of which is stabilized, of from about 3% to 8% of calcium aluminate, forming bodies from said mix and firing said bodies at a temperature of the order of 1525° C.

BACKGROUND OF THE INVENTION

This invention is concerned with kiln furniture such as setter tile, plates, and saggers used for supporting ceramic articles during the firing thereof and is also useful in the production of other refractory ceramic articles such, for example, as crucibles.

Stabilized zirconia has been used for some time in the making of kiln furniture for use in the firing of dielectric bodies containing titanates, zironcates, and the like. In such use it has been superior to zircon and alumina because of its better temperature stability and lesser degree of reactivity. However, it has been found that warping and cracking of setter plates or tile still occurs in use as the plates are repeatedly subjected to a heat cycle in which they are heated to temperatures of the of 1380° C. Moreover, there has remained some difficulty with reactivity of certain dielectric bodies, particularly those containing bismuth, with the stabilized zirconia plates or tile on which they are fired.

It is recognized that, in general, the thermal shock resistance of a stabilized zirconia body is better when the zirconia is not completely stabilized but is stabilized only to the extent of from about 75% to about 95%. Consequently kiln furniture, which is repeatedly subject to thermal shock because of the repeated heating and cooling occurring in use, is usually made from a mixture of completely stabilized granular zirconia and unstabilized granular zirconia, the proportions of the two being varied to obtain a final composition after firing in which the degree of stabilization is within the above-mentioned range. Stabilization may be achieved with a variety of agents such as CaO, MgO, $Y_2O_3$, $CeO_2$, and $ThO_2$. For most purposes CaO is very satisfactory and, because of its lower cost, preferred.

SUMMARY OF THE INVENTION

According to the present invention kiln furniture formed of stabilized zirconia is improved by the addition to the mix used for the production thereof, prior to firing, of small amounts, from about 3 to 8% of the mix, of calcium aluminate. The resultant products exhibit improved heat shock resistance in repeated heating to temperatures of the order of 1380° C. and cooling, and improved resistance to deformation at high temperatures. Because of such resistance they may be made thinner than has been heretofore feasible. Kilns may consequently be operated with a higher efficiency, the higher pay load to dead load ratio not only increasing the effective capacity of the kiln but also reducing the heat wasted on dead load.

In addition, the products of the invention show a relatively low reactivity with dielectric titanate compositions, particularly those containing bismuth, and are therefore well suited for use as setter tile or plates for firing bodies of such dielectric compositions.

The mix used will consist essentially of granular zirconia, which may be partially stabilized or a mixture of partially stabilized and completely stabilized material and may comprise a small amount of a stabilizing agent such as lime. In any event the ingredients of the mix are so proportioned as to give a degree of stabilization in the fired, sintered refractory product in the range from 75% to 95%.

The firing temperatures and times may of course vary as is well recognized in the ceramic art. A temperature between about 1450° C. to about 1550° C. is preferred and the firing time may range from about 3 hours to about 12 hours at the lower end of the temperature range. An oxidizing atmosphere is preferred.

DESCRIPTION OF PREFERRED EMBODIMENTS

In the following examples the production of improved stabilized zirconia bodies according to the invention is described.

EXAMPLE 1

A mixture was prepared of:

| | Parts |
|---|---|
| Fused zirconia (completely stabilized) (—100 mesh) | 55 |
| Fused zirconia (unstabilized) (—325 mesh) | 37 |
| Calcium carbonate (—100 mesh) | 4 |
| Calcium aluminate (—100 mesh) | 5 |

This mixture was blended with sufficient lubricating liquid comprising petroleum oil, glycerol, an aqueous wax emulsion and an aqueous solution of polyvinyl alcohol to produce an extrudable mass. The mass was extruded as a ribbon about 60 mm. wide and 3.3 mm. thick and cut at spaced intervals to give slabs approximately 115 mm. long, before firing, the polyvinyl alcohol in the lubricating liquid providing green strength during handling. Firing of the tile was carried out in an oxidizing atmosphere to a temperature of about 1510° C. which was maintained for 4 hours.

The resultant sintered tile were a light tan color and, because of shrinkage, about 108 mm. x 57 mm. x 3.2 mm. in size.

EXAMPLE 2

A mixture was prepared of:

| | Parts |
|---|---|
| Fused zirconia (completely stabilized) (—100 mesh) | 49.7 |
| Fused zirconia (completed stabilized) (—325 mesh) | 33.2 |
| Fused zirconia (unstabilized) (—100 mesh) | 8.2 |
| Fused zirconia (unstabilized) (—325 mesh) | 5.3 |
| Calcium aluminate (—100 mesh) | 3.8 |

This mixture was blended with a small amount of an aqueous solution of polyvinyl alcohol to impart green strength and pressed at approximately 5000 p.s.i. to form plates which after firing in the same manner as the tile of Example 1, measured approximately 69.9 mm. x 17.9 mm. x 4.8 mm.

EXAMPLE 3

A mixture was prepared of:

| | Parts |
|---|---|
| Fused zirconia (completely stabilized) (—100 mesh) | 43.3 |
| Fused zirconia (completed stabilized) (—325 mesh) | 28.9 |
| Fused zirconia (unstabilized) (—100 mesh) | 13.0 |
| Fused zirconia (unstabilized) (—325 mesh) | 8.7 |
| Calcium aluminate (—100 mesh) | 6.4 |

The pressing of the mixture to form setter plates and the firing thereof were carried out in the same manner as described in Example 2.

Tests were made of the deformation under load at high temperatures of setter tile made according to the foregoing examples. In the tests one end of a tile sections 73 mm. x 17.9 mm. x 3.2 mm. was clamped at one end leaving a 50 mm. portion projecting. A weight was placed on the projecting end of the section and the specimen was heated for 2 hours at 1400° C. The sag or deflection of tile according to the present invention when using a 12 g. weight was substantially nil, ranging from 0.0 mm. to 0.51 mm. It is evident that, while greater weights and/or higher test temperatures will produce greater deformation, tile according to the present invention show good load bearing characteristics at high temperatures.

Tests have shown that setter tile in accordance with the present invention are extremely resistant to heat shock, specimens having been subjected to from 30 to 60 cycles of heating to 1400° C. and cooling before failure. This may be compared with previous used tile which normally do not withstand more than 5 or 6 of such heating-cooling cycles. It has also been determined that setter tile according to the invention are quite unreactive with dielectric titanate compositions.

As is evident from the preceding examples, in many respects the present invention is not critical. Thus the particle sizes of the raw materials used, while specified, can be varied widely in accordance with recognized ceramic practice to obtain bodies in which the shrinkage during drying and firing and the final density are within the desired ranges. Also, while extrusions of a plastic mix is convenient, setter tile may be readily pressed as described above or slip cast by known procedures if desired; for saggers, of course, only pressing or slip casting may be used because of their shape.

The degree of stabilization of bodies in accordance with the invention is, as indicated above, subject to variation as desired. This can be accomplished by varying the relative amounts of completely stabilized and unstabilized zirconia employed. Further control may be obtained, as set forth in Example 1, by the addition of a stabilizing agent such as CaO (the $CaCO_3$ in Example 1 being converted to CaO below the firing temperatures used) or the use of partially stabilized zirconia in the mix. It is to be noted that the calcium aluminate employed has no apparent effect on the degree of stabilization of the zirconia. Commercial calcium aluminates may be used.

In the foregoing description and appended claims parts and percentages are by weight unless otherwise indicated and mesh sizes are U.S. Standard.

I claim:

1. A process for producing refractory, ceramic bodies which comprises forming a mix of granular zirconia and from about 3% to 8% of calcium aluminate, shaping said mix, and firing said shaped mixture at a temperature of the order of 1525° C. to produce a warp resistant sintered body, said mixture containing sufficient stabilized zirconia to cause said fired body to contain at least about 75% but not more than about 95% stabilized zirconia.

2. A process as set forth in claim 1 in which said mix contains about 5% calcium aluminate.

3. A process as set forth in claim 1 in which said mix also contains granular unstabilized zirconia.

4. A process as set forth in claim 3 in which said mix contains about 5% calcium aluminate and a small amount of a stabilizing agent effective to stabilize a portion of said unstabilized zirconia.

References Cited

UNITED STATES PATENTS 2,937,102   5/1960   Wagner _____ 106—57

JAMES E. POER, Primary Examiner